United States Patent
Silberman et al.

(10) Patent No.: US 11,256,509 B2
(45) Date of Patent: Feb. 22, 2022

(54) INSTRUCTION FUSION AFTER REGISTER RENAME

(71) Applicant: International Business Machines Corporation, Armonk, NY (US)

(72) Inventors: Joel A. Silberman, Somers, NY (US); Balaram Sinharoy, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 215 days.

(21) Appl. No.: 15/834,413

(22) Filed: Dec. 7, 2017

(65) Prior Publication Data

US 2019/0179640 A1    Jun. 13, 2019

(51) Int. Cl.
*G06F 9/38*     (2018.01)
*G06F 9/30*     (2018.01)

(52) U.S. Cl.
CPC .......... *G06F 9/30181* (2013.01); *G06F 9/384* (2013.01); *G06F 9/3853* (2013.01); *G06F 9/3867* (2013.01)

(58) Field of Classification Search
CPC ................................ G06F 9/384; G06F 9/3853
See application file for complete search history.

(56) References Cited

U.S. PATENT DOCUMENTS

| 6,516,408 | B1 | 2/2003  | Abiko et al.    |
|-----------|----|---------|-----------------|
| 6,684,332 | B1 | 1/2004  | Douglas         |
| 7,818,550 | B2 | 10/2010 | Vaden           |
| 8,447,800 | B2 | 5/2013  | Dockser et al.  |
| 8,645,935 | B2 | 2/2014  | Barua et al.    |
| 8,904,151 | B2 | 12/2014 | Gschwind et al. |
| 9,110,713 | B2 | 8/2015  | Wang            |
| 9,329,848 | B2 | 5/2016  | Lupon et al.    |

(Continued)

FOREIGN PATENT DOCUMENTS

JP      H04342037 A    11/1992

OTHER PUBLICATIONS

Joel A. Silberman, et al.,"Dynamic Fusion Based on Operand Size", U.S. Appl. No. 15/834,403, filed Dec. 7, 2017.

(Continued)

*Primary Examiner* — Jacob Petranek
(74) *Attorney, Agent, or Firm* — Cantor Colburn LLP; Teddi Maranzano

(57) ABSTRACT

Embodiments of the present invention include methods, systems, and computer program products for implementing instruction fusion after register rename. A computer-implemented method includes receiving, by a processor, a plurality of instructions at an instruction pipeline. The processor can further performing a register rename within the instruction pipeline in response to the received plurality of instructions. The processor can further determine that two or more of the plurality of instructions can be fused after the register rename. The processor can further fuse the two or more instructions that can be fused based on the determination to create one or more fused instructions. The processor can further perform an execution stage within the instruction pipeline to execute the plurality of instructions, including the one or more fused instructions.

5 Claims, 5 Drawing Sheets

(56) References Cited

U.S. PATENT DOCUMENTS

| | | |
|---|---|---|
| 9,405,547 B2 | 8/2016 | Wang et al. |
| 9,477,476 B2 | 10/2016 | Brown et al. |
| 2002/0087955 A1 | 7/2002 | Ronen et al. |
| 2010/0115248 A1 | 5/2010 | Ouziel et al. |
| 2014/0089638 A1* | 3/2014 | Mylius .................. G06F 9/3017 |
| | | 712/208 |
| 2014/0281402 A1* | 9/2014 | Comparan ............ G06F 9/3851 |
| | | 712/214 |
| 2014/0281415 A1* | 9/2014 | Burgess .............. G06F 9/30098 |
| | | 712/217 |
| 2016/0179542 A1 | 6/2016 | Lai et al. |
| 2017/0123808 A1* | 5/2017 | Caulfield ............... G06F 9/3802 |
| 2017/0177343 A1* | 6/2017 | Lai ........................ G06F 9/3016 |
| 2017/0371667 A1 | 12/2017 | Fei |
| 2018/0095752 A1* | 4/2018 | Kudaravalli ........ G06F 12/0875 |
| 2018/0095761 A1* | 4/2018 | Winkel ................. G06F 3/0608 |

OTHER PUBLICATIONS

List of IBM Patents or Patent Applications Treated as Related; Date Filed: Dec. 7, 2017, p. 1-2.

\* cited by examiner

INSTRUCTION FUSION AFTER REGISTER RENAME

BACKGROUND

Embodiments of the present invention relate in general to an out-of-order (OoO) processor and more specifically to fusing instructions after implementing a register-renaming scheme.

In an OoO processor, an instruction sequencing unit (ISU) dispatches instructions to various issue queues, renames registers in support of OoO execution, issues instructions from the various issue queues to the execution pipelines, completes executed instructions, and handles exception conditions. Register renaming is typically performed by mapper logic in the ISU before the instructions are placed in their respective issue queues. The ISU includes one or more issue queues that contain dependency matrices for tracking dependencies between instructions. A dependency matrix typically includes one row and one column for each instruction in the issue queue.

Renaming registers are used by a processor to dynamically execute instructions out-of-order in either a single or multi-threaded processor that executes instructions out-of-order. An OoO processor typically employs register renaming to avoid unnecessary serialization of instructions due to the reuse of a given architected register by subsequent instructions in the program order.

SUMMARY

Embodiments of the present invention include methods, systems, and computer program products for implementing instruction fusion after register rename. A non-limiting example of the computer-implemented method includes receiving, by a processor, a plurality of instructions at an instruction pipeline. The processor can further perform a register rename within the instruction pipeline in response to the received plurality of instructions. The processor can further determine that two or more of the plurality of instructions can be fused after the register rename. The processor can further fuse the two or more instructions that can be fused based on the determination to create one or more fused instructions. The processor can further perform an execution stage within the instruction pipeline to execute the plurality of instructions, including the one or more fused instructions.

Embodiments of the invention are directed to a system. A non-limiting example of the system can include one or more processors in communication with one or more types of memory. The processor can be configured to receive a plurality of instructions at an instruction pipeline. The processor can be configured to perform a register rename within the instruction pipeline in response to the received plurality of instructions. The processor can be configured to determine that two or more of the plurality of instructions can be fused after the register rename. The processor can be configured to fuse the two or more instructions that can be fused based on the determination to create one or more fused instructions. The processor can also be configured to perform performing an execution stage within the instruction pipeline to execute the plurality of instructions, including the one or more fused instructions.

Embodiments of the invention are directed to a computer program product that can include a storage medium readable by a processor that can store instructions for execution by the processor to perform operations. A non-limiting example of the computer program product can include a processor that can receive a plurality of instructions at an instruction pipeline. The processor can perform a register rename within the instruction pipeline in response to the received plurality of instructions. The processor can determine that two or more of the plurality of instructions can be fused after the register rename. The processor fuse the two or more instructions that can be fused based on the determination to create one or more fused instructions. The processor can also perform performing an execution stage within the instruction pipeline to execute the plurality of instructions, including the one or more fused instructions.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
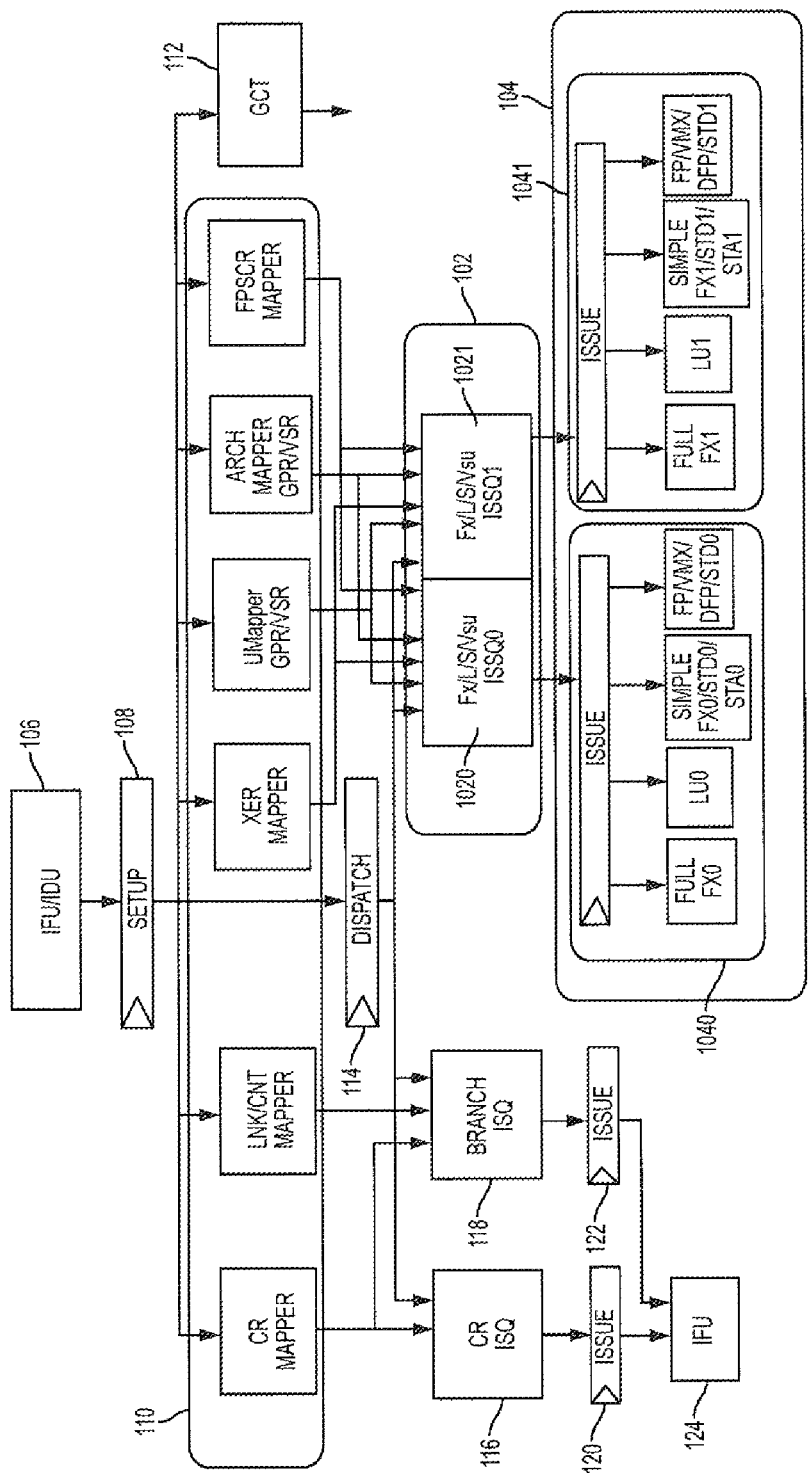
FIG. 1 depicts a block diagram of a system that includes an instruction sequencing unit (ISU) of an out-of-order (OoO) processor for implementing a scalable dependency matrix with a summary bit in an issue queue accordance with one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. In addition, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Embodiments of the invention are related in general to fusing instructions after a register rename in an execution pipeline. Renaming registers that contain variables that are operated on as part of program instructions can be used to fuse two or more instructions that are normally executed in multiple clock cycles to be executed in less clock cycles, i.e. one clock cycle instead of two clock cycles, even though intervening instructions may exist.

In order to increase performance, some processors can fuse or merge certain instructions. The fusing of instructions can occur in a variety of phases/stages of the execution pipeline. Fusing instructions at each phase can have one or more strengths and weaknesses.

One phase in the pipeline in which instruction fusion can occur is before instructions are entered into an instruction cache (I-cache). Some of the strengths associated with fusing instructions at this phase can include: additional clock cycle(s) required during fusion would have less of a performance impact; fusion improves fetch, dispatch and issue bandwidth and reduces latency. Some of the weaknesses associated with fusing instructions at this phase can include: the start of a basic block is not known (target of a branch); branch predictions are not known causing difficulty in fusing instructions across conditional branches; fusion at the I-cache would be prior to register renaming so anti-dependency and output-dependency would limit the amount of fusion that can occur; and because the basic blocks are not known, fusing non-consecutive instructions is more difficult.

One phase in the pipeline in which instruction fusion can occur is after instructions are removed from an instruction buffer (I-buffer). Some of the strengths associated with fusing instructions at this phase can include: fusion of non-consecutive instructions because branch predictions are known; additional clock cycle(s) for fusion could be hidden if done in parallel with the register renaming; and fusion improves dispatch and Issue bandwidth and reduces latency, but does not improve fetch bandwidth. A weakness associated with fusing instructions at this phase can be that fusion at the I-buffer would be prior to register renaming so anti-dependency and output-dependency will limit the amount of fusion that can occur.

One phase in the pipeline in which instruction fusion can occur is when a trace cache is created and instructions are fused in the trace. The fused instructions would subsequently be fetch from a loop cache. Some of the strengths associated with fusing instructions at this phase can include: because this operation can occur offline, no additional cycles are needed for fusion; a fusion window can be larger because there is no severe timing pressure; and fetch, dispatch and issue bandwidth is improved. Some of the weaknesses associated with fusing instructions at this phase can include: poor hit rates in the loop cache; fusion in the trace cache would be prior to register renaming so anti-dependency and output-dependency will limit the amount of fusion that can occur; and prediction accuracy of the small trace cache will be lower than large branch prediction tables.

An illustration of how anti-dependency and output-dependency can limit the amount of fusion of instructions that can occur is the following:

ADD R3←R1+R2
LD R1←(R5)
ADD R5←R3+R4

Although the two addition instructions are not dependent on the load instruction from a flow perspective, the intervening/intermediate load instruction limits how execution operations can be structured. As a result, the two add operations cannot be combined. Accordingly, the two add instructions, which could be executed in parallel are not due to the intervening load instruction and register interdependence.

Register renaming is a technique used by an instruction-sequencing unit of out-of-order superscalar processors to eliminate serialized execution of instructions due to output and anti-dependencies. Register renaming is a process, within the execution pipeline, of mapping a relatively small architected or logical register name space to a large physical register name space in order to enable out-of-order execution of multiple instructions.

One or more embodiments of the invention can fuse instructions after a register rename stage in the execution pipeline. Accordingly, the above-described aspects and embodiments of the invention address the shortcomings of the prior art by improving performance when back-to-back (B2B) instruction execution cannot be performed. In addition, fusion after the register rename stage can also remove anti-dependency (i.e., write-after-read (WAR), which occurs when an instruction requires a variable value that is later updated) and/or output dependency (i.e., write-after-write (WAW), which occurs when the ordering of instructions will affect the final output value of a variable).

Turning now to FIG. 1, a block diagram of a system 100 that includes an instruction sequencing unit (ISU) of an out-of-order (OoO) processor for implementing instruction fusion after register rename is generally shown according to one or more embodiments of the present invention. The system 100 shown in FIG. 1 includes an instruction fetch unit/instruction decode unit (IFU/IDU) 106 that fetches and decodes instructions for input to a setup block 108 which prepares the decoded instructions for input to a mapper 110 of the ISU. In accordance with one or more embodiments of the present invention, six instructions at a time from a thread can be fetched and decoded by the IFU/IDU 106. In accordance with one or more embodiments of the present invention, the six instructions sent to the setup block 108 can include six non-branch instructions, five non-branch instructions and one branch instruction, or four non-branch instructions and two branch instructions. In accordance with one or more embodiments of the present invention, the setup block 108 checks that sufficient resources such as entries in the issue queues, completion table, mappers and register files exist before transmitting the fetched instructions to these blocks in the ISU.

The mappers 110 shown in FIG. 1 map programmer instructions (e.g., logical register names) to physical resources of the processor (e.g., physical register addresses). A variety of mappers 110 are shown in FIG. 1 including a condition register (CR) mapper; a link/count (LNK/CNT) register mapper; an integer exception register (XER) mapper; a unified mapper (UMapper) for mapping general purpose registers (GPRs) and vector-scalar registers (VSRs); an architected mapper (ARCH Mapper) for mapping GPRs and VSRs; and, a floating point status and control register (FPSCR) mapper.

The output from the setup block 108 is also input to a global completion table (GCT) 112 for tracking all of the instructions currently in the ISU. The output from the setup block 108 is also input to a dispatch unit 114 for dispatching the instructions to an issue queue. The embodiment of the ISU shown in FIG. 1 includes a CR issue queue, CR ISQ 116, which receives and tracks instructions from the CR mapper and issues 120 them to instruction fetch unit (IFU) 124 to execute CR logical instructions and movement instructions. Also shown in FIG. 1 is a branch issue queue, Branch ISQ 118, which receives and tracks branch instructions and LNK/CNT physical addresses from the LNK/CNT mapper. Branch ISQ 118 can issue 122 an instruction to IFU 124 to redirect instruction fetching if a predicted branch address and/or direction was incorrect.

Instructions output from the dispatch logic and renamed registers from the LNK/CNT mapper, XER mapper, UMapper (GPR/VSR), ARCH Mapper (GPR/VSR), and FPSCR mapper are input to issue queue 102. As shown in FIG. 1, issue queue 102 tracks dispatched fixed-point instructions (Fx), load instructions (L), store instructions (S), and vector-and-scaler unit (VSU) instructions. As shown in the embodiment of FIG. 1, issue queue 102 is broken up into two parts, ISQ0 1020 and ISQ1 1021, each portion holding N/2 instructions. When the processor is executing in ST mode, the issue queue 102 can be used as a single logical issue queue that contains both ISQ0 1020 and ISQ1 1021 to process all of the instructions (in this example all N instructions) of a single thread.

When the processor is executing in SMT mode, ISQ0 1020 can be used to process N/2 instructions from a first thread and ISQ1 1021 is used to process N/2 instructions from a second thread ISQ1 1021.

As shown in FIG. 1, issue queue 102 issues instructions to execution units 104, which are split into two groups of execution units 1040 1041. Both groups of execution units 1040 1041 shown in FIG. 1 include a full fixed point execution unit (Full FX0, Full FX1); a load execution unit (LU0, LU1); a simple fixed point, store data, and store address execution unit (Simple FX0/STD0/STA0, Simple FX1/STD1/STA1); and a floating point, vector multimedia extension, decimal floating point, and store data execution unit (FP/VMX/DFP/STD0, FP/VMX/DFP/STD1). As shown in FIG. 1, when the processor is executing in ST mode, the first group of execution units 1040 execute instructions issued from ISQ0 1020 and the second group of execution units 1041 execute instructions issued from ISQ1 1021. In alternate embodiments of the present invention when the processor is executing in ST mode, instructions issued from both ISQ0 1020 and ISQ1 1021 in issue queue 102 can be issued to execution units in any of the execution units 1040 in the first group of execution units 1040 and the second group of execution units 1041.

In accordance with one or more embodiments of the present invention, when the processor is executing in SMT mode, the first group of execution units 1040 execute instructions of the first thread issued from ISQ0 1020 and the second group of execution units 1041 execute instructions of the second thread issued from ISQ1 1021.

The number of entries in the issue queue 102 and sizes of other elements (e.g., bus widths, queue sizes) shown in FIG. 1 are intended to be exemplary in nature as embodiments of the present invention can be implemented for issue queues and other elements of a variety of different sizes. In accordance with one or more embodiments of the present invention, the sizes are selectable, or programmable.

Figure 2:
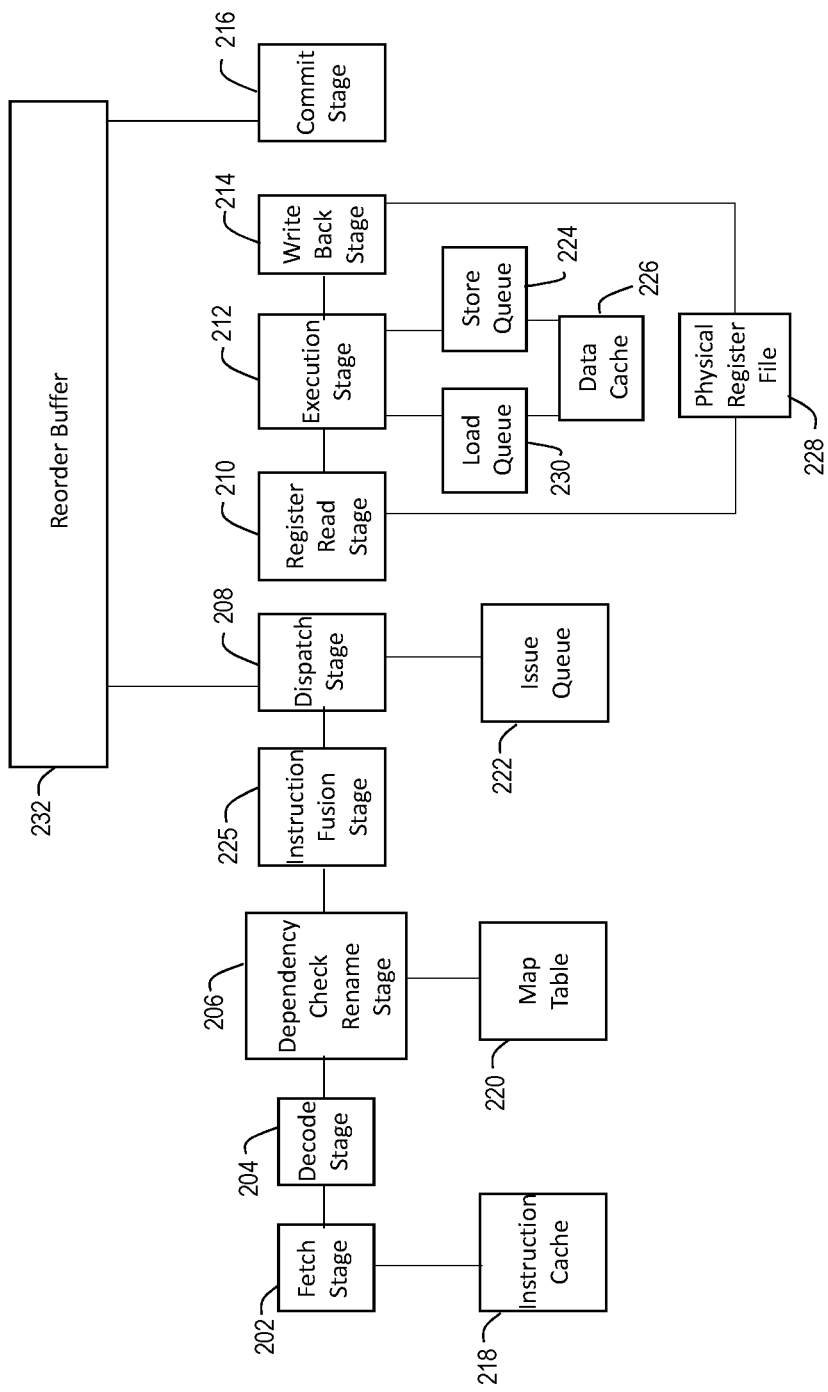
FIG. 2 depicts a block diagram of an out-of-order pipeline supporting out-of-order processing where instructions are processed out-of-order in accordance with one or more embodiments of the present invention.

Turning now to FIG. 2, a block diagram illustrating an out-of-order pipeline 200, supporting out-of-order processing on one or more threads where instructions are processed out-of-order by the IFU/IDU 106, is generally shown according to one or more embodiments of the present invention. Instruction pipelining is a technique to increase instruction throughput by splitting the processing of computer instructions into a series of steps with storage at the end of each step. Processors with instruction pipelining, i.e. pipelined processors, are internally organized into stages which can semi-independently work on separate jobs. Each stage is organized and linked with a next stage in a series chain so that each stage's output is fed to another stage until the final stage of the pipeline.

The out-of-order pipeline 200 processes each instruction based on the readiness of each instruction to be executed. The out-of-order pipeline 200 does not sit idle when an instruction that is to be processed is not ready to be executed. Rather, the out-of-order pipeline 200 bypasses an instruction that is missing information and executes the next instruction that is ready to be executed. Out-of-order pipeline 200 includes a fetch stage 202, a decode stage 204, a dependency check rename stage 206, a dispatch stage 208, a register read stage 210, an execution stage 212, a write back stage 214, a commit stage 216, an instruction cache 218, a map table 220, issue queue 102, a store queue 224, a data cache 226, a physical register file 228, a load queue 230, and a reorder buffer 232.

Out-of-order pipeline 200 depicts an exemplary implementation of an out-of-order pipeline and the stages and/or structures that an out-of-order pipeline may include. Fetch stage 202 retrieves an instruction stored in instruction cache 218. Instruction cache 218 stores copies of the instruction located in main memory so that fetch stage 202 retrieves a copy of the instruction from the instruction cache 218 rather than accessing a main memory for the instruction. Fetch stage 202 can retrieve instructions from one or more instruction streams where fetch stage 202 retrieves more than one instruction per clock cycle. Decoder stage 204 can interpret the instruction provided by fetch stage 202. Decode stage 204 interprets instructions from an instruction stream where decode stage 204 interprets more than one instruction per clock cycle.

Dependency check rename stage 206 can rename the registers referenced by instructions to prevent write-after-write (WAW) and write-after-read (WAR) stalls. Dependency check rename stage 206 maps logical register names provided by a compiler into physical register names that are stored in physical register file 228. Dependency check rename stage 206 consults map table 220 to determine which physical registers correspond to the logical register names referenced in the instructions provided by decoder stage 204. Dependency check rename stage 206 may also allocate a new physical register for an instruction. Dependency check rename stage 206 updates map table 220 with the new physical register location for the instruction. Dependency check rename stage 206 may also perform a dependence cross-check of each instruction in a rename group. Dependency check rename stage 206 checks whether each younger instruction depends on an older instruction. Dependency check rename stage 206 updates map table 220 so that each younger instruction properly depends from each older instruction.

After the registers identified in each instruction have been renamed by dependency check rename stage 206, the instruction fusion stage 225 can determine whether instructions within the rename registers can be fused. The instruction fusion stage can inspect instructions associated with each of the physical registers and can fuse/combine two or more instructions.

Dispatching stage 208 can dispatch each instruction into issue queue 102 where each instruction waits for its respective input operands to become available. An instruction becomes ready to execute when the input operands for the instruction become available. Issue queue 102 can then issue each instruction that has received its respective input operands as ready to be executed. Register read stage 210 can retrieve the contents of each register location corresponding to each input operand of each issued instruction and provides each issued instruction to execution stage 212 to be executed using the retrieved contents of the operand registers.

Execution stage 212 can be implemented as a number of different types of execution units, e.g., a generic fixed point or floating point unit, or a specialized execution unit such as a graphics processing unit, encryption/decryption unit, coprocessor, XML processing unit, or other execution unit, whether scalar or vector in nature. In addition, multiple execution units may be disposed in pipeline 200 such that multiple instructions may be issued per cycle.

Execution stage 212 can buffer store instructions into store queue 224. Execution stage 212 may not commit store instructions to memory until the store instructions reach retirement. Rather, store instructions including the memory address and store data may be buffered in store queue 224 until they reach retirement. This avoids write-after-read (WAR) and write-after-write (WAW) dependency problems where an earlier load instruction receives an incorrect value from the memory because a later store instruction was allowed to execute before the earlier load instruction. Execution stage 212 buffers load instructions in a load queue until retirement. Execution stage 212 executes load instructions by accessing the location in memory and/or store queue 224 to obtain its data value and then the address and data for each load instruction are buffered in load queue 230. Execution stage 212 may read or write load instructions and store instructions to and from data cache 226 rather than memory to speed up the execution of load instructions and store instructions.

After each instruction has been executed by execution stage 212, the results of each executed instruction may be written to physical register file 228 by write back stage 214. Reorder buffer 232 reorders each executed instruction from the data order in which each instruction was executed to the program order in which each instruction was ordered in the original program code. Commit stage 216 then stores the results of each executed instruction based on the order provided by reorder buffer 232 to memory.

Figure 3:
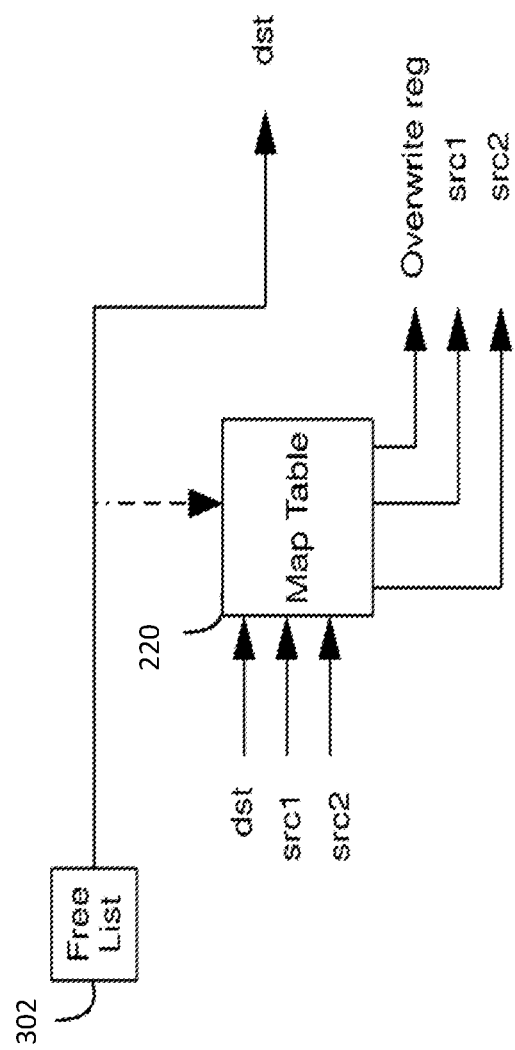
FIG. 3 is a block diagram illustrating an out-of-order renaming configuration in accordance with one or more embodiments of the present invention.

FIG. 3 illustrates an out-of-order renaming configuration 300 according to one or more embodiments of the invention. Out-of-order renaming configuration 300 includes map table 220 and free list 302. Free list 302 may be a structure storing a list of the available physical registers, which are not in use by any instruction currently executing in the processor As noted above, registers may be renamed, for example, to prevent WAW stalls and WAR stalls in out-of-order processing. Out-of-order renaming configuration 300 maps the logical register named by a compiler to physical register file 228 where a quantity of physical registers exceeds a quantity of logical registers. Map table 220 may be updated each time an instruction is renamed to determine which physical register includes the information from the logical register for the instruction. The instruction with a target logical register, allocates a new physical register to hold the result of the instruction, and updates map table 220 to reflect the new mapping from the logical register to physical register file 228 for the instruction.

Revisiting the previous example illustrating a set of instructions limited by anti-dependency and output dependency,
ADD R3←R1+R2
LD R1←(R5)
ADD R5←R3+R4 the recited dependencies can be eliminated when registers associated with the recited operations are renamed. For example, during register renaming, the previous registers can be renamed as follows:
ADD Rtag3←Rtag1+Rtag2
LD Rtag7←(Rtag5)
ADD Rtag8←Rtag1+Rtag2+Rtag4

As indicated register R1 associated with the load instruction has been renamed, Rtag7 and register R5 associated with the second add instruction has been renamed Rtag8. By renaming these registers, anti-dependency and/or output dependency have been removed thereby allowing the third instruction to be a fusion of the first and the third instruction. With that, both add instructions can be executed in parallel. Accordingly, execution of the three instructions (ADD, LD, ADD) can occur in one clock cycle (all three instructions being executed in parallel, since there is no dependency among them), instead of two clock cycles because due to the fusion, the second ADD instruction is not dependent anymore on the first ADD instruction. Thus, the recited fusion technique increases instruction throughput by reducing the number of clock cycles to execute instructions in comparison to executing the instructions separately, which improves performance for system 100.

Another instance in which fusion after register renaming would be beneficial can be when a first instruction (fusable instruction) and a second instruction (fused instruction) have a same target register in which no intermediate instructions use the associated target register. In such an instance, the fusable instruction can be eliminated after being combined with the fused instruction (in the example above, the first ADD instruction could not be eliminated, since the two ADD instructions do not have the same target). Another instance in which fusion after register renaming would be beneficial can be when the fusable instruction and fused instruction have a same target register but an intermediate instruction exists that uses the target register. In this instance, the fusable instruction would be executed (not eliminated) but a reduced latency in the execution of instructions would occur.

Another instance in which fusion after register renaming would be beneficial can be when the fusable instruction and fused instruction have a different target register and no intermediate instruction uses the target register of the fusable instruction. In this instance, the fusable instruction would be executed (not eliminated) but a reduced latency in the execution of instructions would occur. Another instance in which fusion after register renaming would be beneficial can occur when the fusable instruction and fused instruction have a different target register but an intermediate instruction uses the target register of the fusable instruction. In this instance, the fusable instruction would be executed (not eliminated) but a reduced latency in the execution of instructions would occur.

Figure 4:
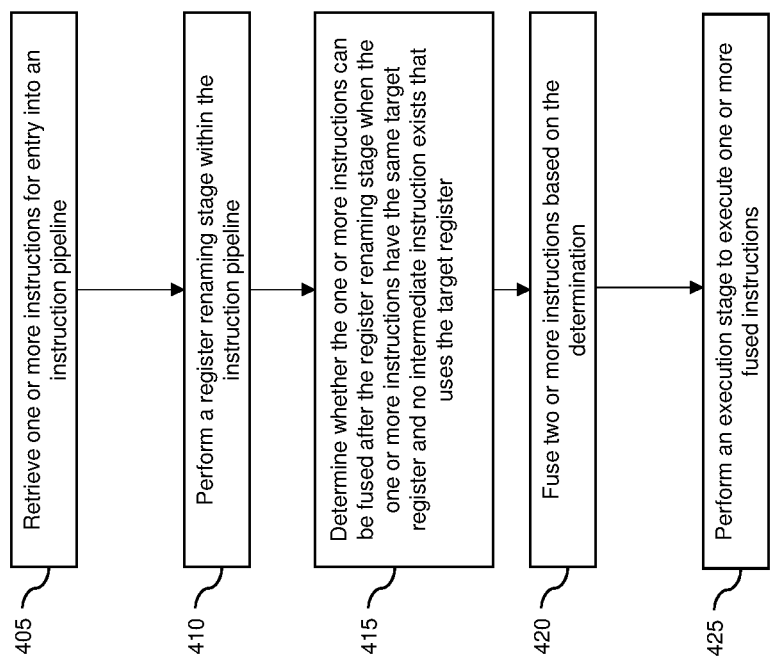
FIG. 4 is a flow diagram illustrating a method for instruction fusion after register rename in accordance with one or more embodiments of the present invention.

Turning now to FIG. 4, a flow diagram illustrating a method for instruction fusion after register rename (400) according to one or more embodiments of the present invention. At block 405, one or more instructions in an instruction stream can be retrieved by an instruction pipeline. At block 410, while the one or more instructions traverse the instruction pipeline, a register renaming stage within the instruction pipeline is performed in order to associate logical registers referenced in the instruction stream with physical registers. At block 415, after register renaming, the one or more instructions are inspected to determine whether any of the one or more instructions can be fused. At block 420, the one or more instructions that can be fused based on the determination of block 415 are fused using the renamed registers. At block 425, the instructions from the instruction stream are executed during an execution stage of the instruction pipeline, including the fused instructions.

Figure 5:
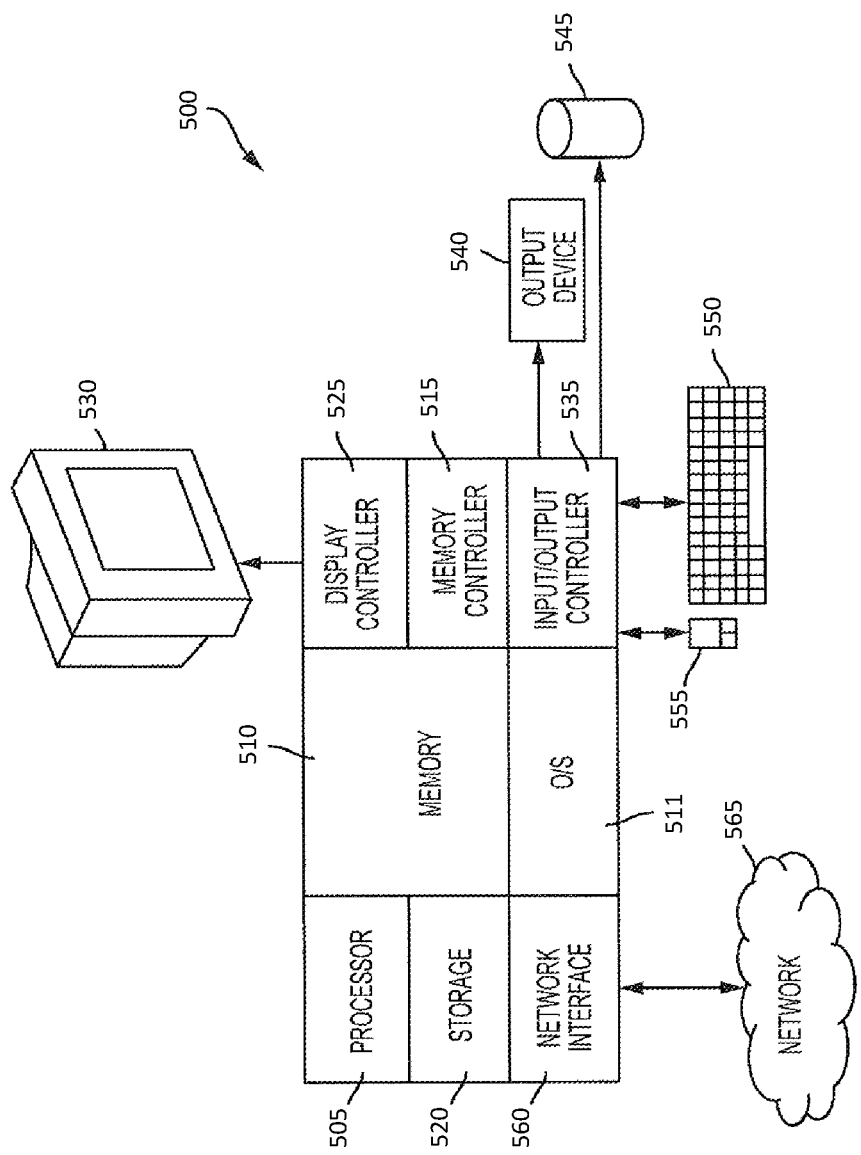
FIG. 5 depicts a block diagram of a computer system for implementing some or all aspects of instruction fusion after register rename in accordance with one or more embodiments of the present invention.

Turning now to FIG. 5, a block diagram of a computer system 500 for implementing some or all aspects of instruction fusion after register rename is generally shown according to one or more embodiments of the present invention. The processing described herein may be implemented in hardware, software (e.g., firmware), or a combination thereof. In an exemplary embodiment, the methods described may be implemented, at least in part, in hardware and may be part of the microprocessor of a special or general-purpose computer system 500, such as a mobile device, personal computer, workstation, minicomputer, or mainframe computer.

In an exemplary embodiment, as shown in FIG. 5, the computer system 500 includes a processor 505, memory 510 coupled to a memory controller 515, and one or more input devices 545 and/or output devices 540, such as peripherals, that are communicatively coupled via a local I/O controller 535. These devices 540 and 545 may include, for example, a printer, a scanner, a microphone, and the like. A conventional keyboard 550 and mouse 555 may be coupled to the I/O controller 535. The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 540, 545 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 510. The processor 505 may be a custom made or commercially available processor, a central processing unit (CPU), an auxiliary processor among several processors associated with the computer system 500, a semiconductor based microprocessor (in the form of a microchip or chip set), a microprocessor, or other device for executing instructions. The processor 505 can include a cache such as, but not limited to, an instruction cache to speed up executable instruction fetch, a data cache to speed up data fetch and store, and a translation look-aside buffer (TLB) used to speed up virtual-to-physical address translation for both executable instructions and data. The cache may be organized as a hierarchy of more cache levels (L1, L2, etc.).

The memory 510 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, or other types of storage media. Note that the memory 510 may have a distributed architecture, where various components are situated remote from one another but may be accessed by the processor 505.

The instructions in memory 510 may include one or more separate programs, each of which comprises an ordered listing of executable instructions for implementing logical functions. In the example of FIG. 5, the instructions in the memory 510 include a suitable operating system (OS) 511. The operating system 511 essentially may control the execution of other computer programs and provides scheduling, input-output control, file and data management, memory management, and communication control and related services.

Additional data, including, for example, instructions for the processor 505 or other retrievable information, may be stored in storage 520, which may be a storage device such as a hard disk drive or solid state drive. The stored instructions in memory 510 or in storage 520 may include those enabling the processor to execute one or more aspects of the dispatch systems and methods of this disclosure.

The computer system 500 may further include a display controller 525 coupled to a display 530. In an exemplary embodiment, the computer system 500 may further include a network interface 560 for coupling to a network 565. The network 565 may be an IP-based network for communication between the computer system 500 and an external server, client and the like via a broadband connection. The network 565 transmits and receives data between the computer system 500 and external systems. In an exemplary embodiment, the network 565 may be a managed IP network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 565 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods for providing instruction fusion after register rename can be embodied, in whole or in part, in computer program products or in computer systems 500, such as that illustrated in FIG. 5. The disclosed systems and methods can perform a fusion of instructions subsequent to registers being renamed from an associated logical name to an associated physical name. Fusion after register renaming can provide a plurality of benefits, including: reduced processor latency, an improved per-thread performance and a reduction of a critical flow decency path by removing at least some aspects of anti-dependency and/or output dependency.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, by a processor, a plurality of instructions at an instruction pipeline;
   performing, by the processor, a register rename within the instruction pipeline in response to the received plurality of instructions, wherein the register rename includes:
      mapping logical register names provided by a compiler into physical register names that are stored in physical register file; and
      performing a dependence cross-check of each instruction to determine whether a younger instruction depends on an older instruction;
   determining, by the processor based at least in part on the dependence cross-check, that two of the plurality of instructions, comprising a first instruction and a second instruction, can be fused after the register rename when the two of the plurality of instructions have the same target register and no intermediate instruction exists that uses the target register;
   fusing, by the processor, the two instructions that can be fused based on the determination to alter the second instruction into a fused instruction by combining the first instruction with the second instruction;
   eliminating, by the processor, the first instruction; and
   performing, by the processor, an execution stage within the instruction pipeline to execute the plurality of instructions, including the fused instruction.

2. The computer-implemented method of claim 1, wherein the fused instructions is executed in a number of clock cycles that are less than a number of clock cycles for executing each instruction of the fused instructions separately.

3. A system comprising:
   a memory having computer readable instructions; and
   one or more processors for executing the computer readable instructions, the computer readable instructions controlling the one or more processors to perform operations comprising:
      receiving a plurality of instructions at an instruction pipeline;
      performing a register rename within the instruction pipeline in response to the received plurality of instructions, wherein the register rename includes:
         mapping logical register names provided by a compiler into physical register names that are stored in physical register file; and
         performing a dependence cross-check of each instruction to determine whether a younger instruction depends on an older instruction;
      determining, based at least in part on the dependence cross-check, that two of the plurality of instructions, comprising a first instruction and a second instruction, can be fused after the register rename when the two of the plurality of instructions have the same target register and no intermediate instruction exists that uses the target register;
      fusing the two instructions that can be fused based on the determination to alter the second instruction into a fused instruction by combining the first instruction with the second instruction;
      eliminating the first instruction; and
      performing an execution stage within the instruction pipeline to execute the plurality of instructions, including the fused instruction.

4. The system of claim 3, wherein fused instructions is executed in a number of clock cycles that are less than a number of clock cycles for executing each instruction of the fused instructions separately.

5. A computer program product comprising a computer readable storage medium having program instructions embodied therewith, the program instructions executable by a processor to cause the processor to perform operations comprising:
   receiving a plurality of instructions at an instruction pipeline;
   performing a register rename within the instruction pipeline in response to the received plurality of instructions, wherein the register rename includes:
      mapping logical register names provided by a compiler into physical register names that are stored in physical register file; and
      performing a dependence cross-check of each instruction to determine whether a younger instruction depends on an older instruction;
   determining, based at least in part on the dependence cross-check, that two of the plurality of instructions, comprising a first instruction and a second instruction, can be fused after the register rename when the two of the plurality of instructions have the same target register and no intermediate instruction exists that uses the target register;

fusing the two instructions that can be fused based on the determination to alter the second instruction into a fused instruction by combining the first instruction with the second instruction;
eliminating the first instruction; and
performing an execution stage within the instruction pipeline to execute the plurality of instructions, including the fused instruction.

\* \* \* \* \*